F. A. HUMPHREY.
Nut-Cracker.

No. 204,225.                Patented May 28, 1878.

Witnesses.
Carl Mohr
H. H. Bigelow

Inventor
Frank A. Humphrey
By Chas. H. Burleigh

UNITED STATES PATENT OFFICE.

FRANK A. HUMPHREY, OF WORCESTER, MASSACHUSETTS.

IMPROVEMENT IN NUT-CRACKERS.

Specification forming part of Letters Patent No. 204,225, dated May 28, 1878; application filed April 8, 1878.

*To all whom it may concern:*

Be it known that I, FRANK A. HUMPHREY, of Worcester, in the county of Worcester and State of Massachusetts, have invented certain new and useful Improvements in Nut-Crackers; and I declare the following to be a description of my said invention sufficiently full, clear, and exact to enable others skilled in the art to which it appertains to make and use the same, reference being had to the accompanying drawings, which form a part of this specification, and in which—

Figure 1:
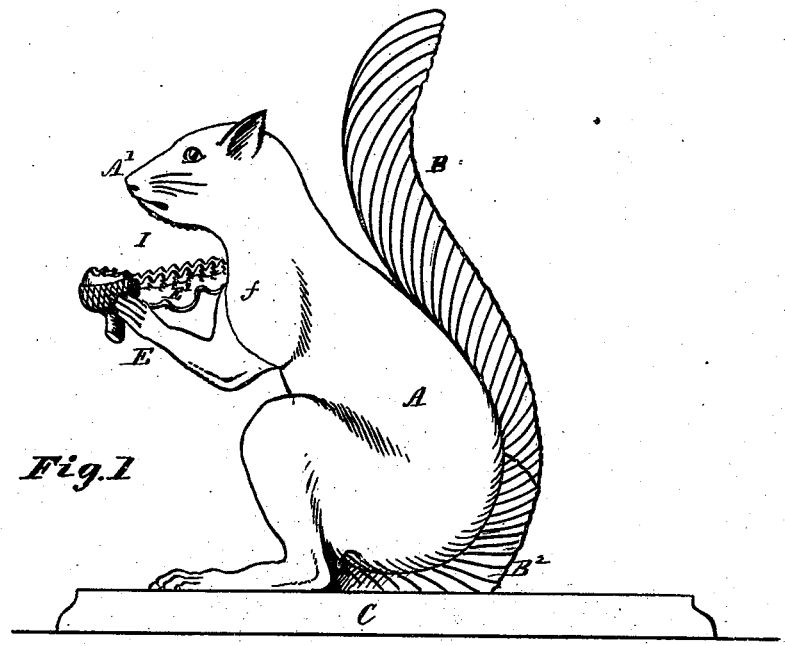
Figure 3:
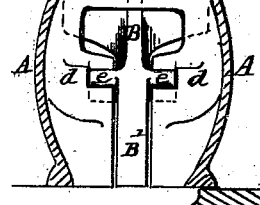
Figure 2:
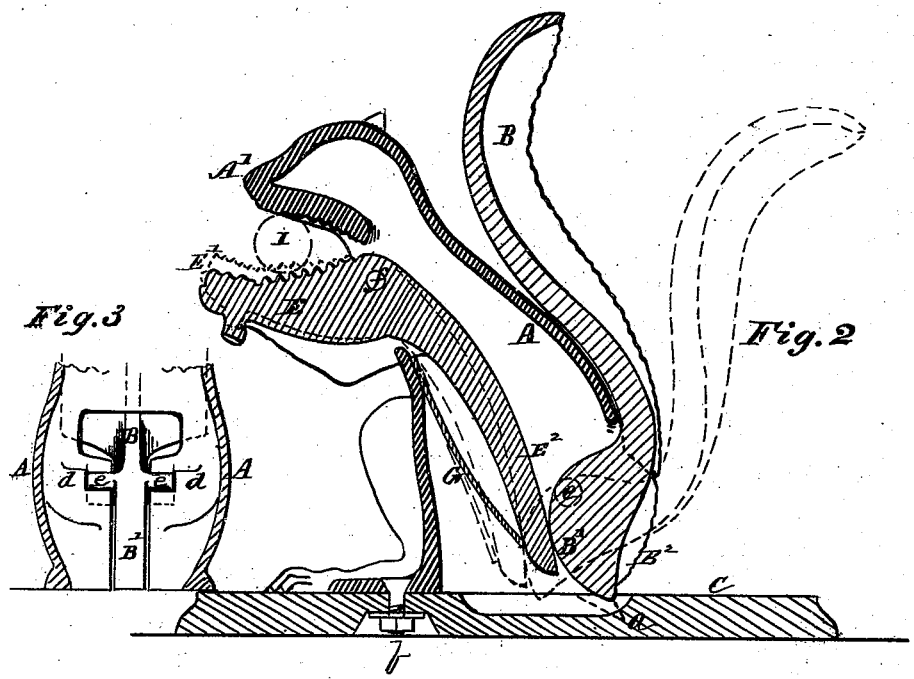

Figure 1 is a side view of my improved nut-cracker. Fig. 2 is a central vertical section of the same, and Fig. 3 is a transverse vertical section of the lower portion.

My invention consists in a nut-cracker made in the form of an animal, and arranged for crushing the nut by movement of the fore-paws toward the head when depressing the tail as a lever, substantially as hereinafter described, the same being an improved article of manufacture.

In the drawings, A denotes the frame or body, made in the shape of an animal sitting upon its haunches, with its tail B curved upward along its back, in the manner illustrated. Said body A is formed of a thin shell of cast metal, and mounted upon a suitable base or pedestal, C, to which it is, in the present instance, secured by inclined spurs $a$ and a clamp-bolt, $b$.

The lower rear portion of the body is made with inner side-recessed lugs $d\ d$, into which fit trunnions $e\ e$, cast upon the sides of the tail-piece B, (see Fig. 3,) said trunnions forming the fulcrum or pivot on which the tail B can swing as a lever for operating the crusher mechanism.

The lower part of the tail-piece is rounded off to form the operating-cam $B^1$, the same being formed laterally narrow, so as to work in the slot or space between the recessed lugs $d\ d$ at the lower part of the frame, while the metal to give form or outer contour to the tail at its lower part $B^2$ is cast with the body A, as indicated.

By lifting the tail vertically the trunnions $e$ may be unseated or freed from their recesses, and the tail separated from the body, if desired.

E denotes the fore paws or arms, which are formed as in the act of holding an acorn and leaf, $E^1$, and which serve as the crusher-jaw. Said arm-piece E is pivoted through the shoulder at $f$, and extends downward, as at $E^2$, within the body A, into a position to be acted upon by the cam $B^1$.

A spring, G, attached to the front of the frame A and pressing against the lower part of lever $E^2$, serves to hold said lever against the cam $B^1$, and to keep the tail-lever B in elevated position.

The corrugated surface of the leaf $E^1$ forms one of the crusher-jaws, while the under part of the animal's head $A'$, or corrugated chin, forms the other part of the crusher.

The operation of cracking the nut is effected by placing the nut at I; then, by depressing the tail, the fore paws (or lever) E swing the corrugated surface upward toward the snout $A'$, and crush the nut against the snout or chin, as indicated by dotted lines in Fig. 2.

In the present instance the nut-cracker is made in the form of a squirrel, that being considered the most appropriate and best form; but I do not desire to confine myself to the form of a squirrel, since other equivalent animal forms might be employed without departing from the spirit of my invention.

What I claim as my invention, and desire to secure by Letters Patent, is—

The nut-cracker device made in the form of a squirrel sitting upon his haunches, and arranged for crushing a nut placed beneath the snout or chin by upward movement of the fore-paws, resultant from downward pressure or action of the tail, substantially as herein set forth.

Witness my hand this 5th day of April, A. D. 1878.

FRANK A. HUMPHREY.

Witnesses:
 CHAS. H. BURLEIGH,
 CARL MOHR.